No. 793,589. PATENTED JUNE 27, 1905.
R. M. KELLOGG.
METHOD OF REPAIRING PIPES.
APPLICATION FILED FEB. 16, 1905.

Witnesses
Carrie E. Colling
Harry H. Walton

Inventor
Robert M. Kellogg
by Alexander C. Proudfit
his Attorney

No. 793,589.

Patented June 27, 1905.

UNITED STATES PATENT OFFICE.

ROBERT M. KELLOGG, OF METUCHEN, NEW JERSEY.

METHOD OF REPAIRING PIPES.

SPECIFICATION forming part of Letters Patent No. 793,589, dated June 27, 1905.

Original application filed July 13, 1901, Serial No. 68,164. Divided and this application filed February 16, 1905. Serial No. 245,901.

*To all whom it may concern:*

Be it known that I, ROBERT M. KELLOGG, of Metuchen, New Jersey, have invented certain Improvements in Methods of Repairing Pipes, of which the following description, in connection with the accompanying drawings, is a specification, like numerals on the drawings designating like parts.

This invention relates to methods of repairing ruptured pipes, and has especial reference to reducing the bursting tendency in ruptured pipes forming part of water-distribution systems, although my invention may be utilized in any field to which it is adapted.

It has been the practice to repair ruptured pipes when the break occurred at a portion of the pipe intermediate of two joints by applying the sleeve at that point and to attempt to heal the break by stuffing the crack or interposing a layer of packing material or cement between the pipes and the sleeve; but such an expedient is expensive and at the best temporary, the crack being liable to enlargement and the packing to deterioration, toward which the water of leakage contributes. When the break occurs at or near a joint, the ruptured portion is usually cut out and a substitute part inserted, occasioning delay and involving a relatively large expense and fire and other risks and annoyances from the interruption of the flow of water.

The object of my invention is to render possible the repairing of breaks near joints of pipes and to provide an efficient repair-joint wherever applied, utilizing the water of leakage to set up a balance of pressure on the two sides of the ruptured pipe and provide exterior support therefor.

My invention consists in a method of repairing leaks in pipes, as herein illustrated and described, and set forth in the claims.

To illustrate the manner of carrying out my invention, reference is had to the accompanying drawings, in which—

Figure 1:
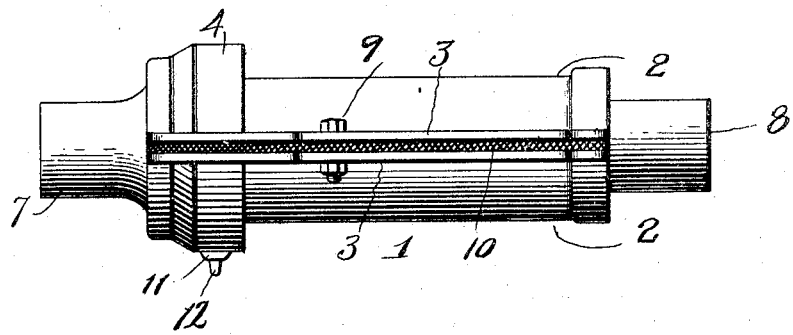
Figure 2:
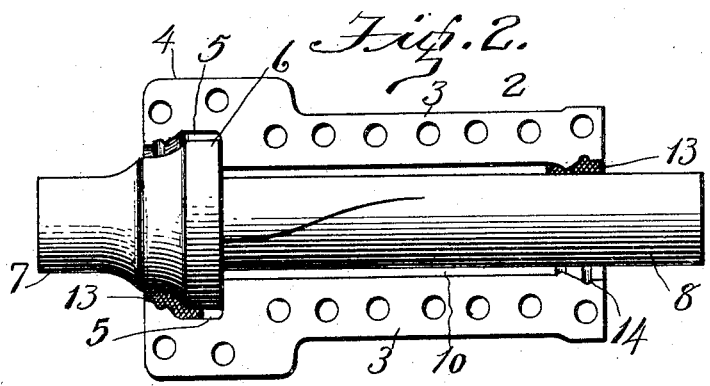

Figure 1 is a side view in elevation of a sleeve secured over a pipe at its joint in accordance with my invention. Fig. 2 is a plan view of one-half of the sleeve located at the pipe-joint, the other member of the sleeve being removed.

In accordance with this invention a repair-sleeve provided with a vent to prevent the escape of water of leakage is mounted on the ruptured portion of a pipe, inclosing the break, and is sealed on each side of the rupture while the vent is still open and the water of leakage is escaping. The vent is then closed, so that the water of leakage thereafter escaping into the sleeve is retained and sets up a balance of pressure with reference to the fractured wall of the pipe and provides an elastic support exteriorly to the walls of the ruptured pipe.

Preferably the sealing of the sleeve is accomplished in such a manner that air will be retained in the sleeve and coöperate with the water of leakage to set up the countervailing support to the fractured wall of the pipe and also serve as an elastic cushion against water-hammering and like shocks or changes of pressure, and this may be accomplished conveniently by locating the vent at a low portion of the sleeve, whereby the accumulation of water of leakage above the vent will seal it against escape of the inclosed air.

To illustrate the manner of carrying out the method embodying my invention, I provide a repair-sleeve 1, formed in two longitudinal parts 2, each having lateral flanges 3 and a head or enlargement 4 at one end and an internal circumferential groove and tapering portion 5, conforming to the shape of and adapted to inclose the enlarged portion 6 of the joint formed by the ends of the pipes 7 and 8. The parts 2 of the sleeve 1 are fastened together by suitable means—as, for example, by bolts 9 passing through the flanges 3, a packing 10, preferably of asbestos or other suitable material, being clamped between the flanges 3. At a low portion of the sleeve 1 is located a suitable aperture or vent 11, opening into the space within the sleeve and provided with a suitable plug or stopper 12. The ends of the sleeve 1 are sealed by tamping lead 13 or other suitable material in the circumferential groove and tapering portion 5 about the enlarged portion 6 of the pipe 7 and in the circumferential grooved and ribbed portion 14 of the other end of the sleeve 1. The method of repairing a rupture in a pipe according to my invention is therefore as follows: A suitable repair-sleeve provided with a vent and removable stopper or plug at its low portion is mounted on the pipe about the rupture, the vent being left open. The sleeve is then sealed, while the water of leakage is free to escape. The sleeve having been sealed, the vent is closed and the water of leakage accumulates in the sleeve about the pipe and the fracture or point of leakage, forming an elastic cushion for the walls of the pipe and transferring the pressure to the walls of the sleeve, thereby relieving the fractured portion of the pipe from the bursting pressure.

The sleeve may be sealed in such manner that air will be inclosed and coöperate with the water of leakage to serve as an elastic cushion against pressure and water-hammering in the fractured pipe.

I make no claim herein to the apparatus for carrying out my invention, as that is the subject of an application filed by me July 13, 1901, Serial No. 68,164, and of which this is a divisional application.

Having described my invention, I claim—

1. The method of repairing ruptured water-pipes, consisting in inclosing the fractured portion of a pipe with a sleeve, having a vent in its lower portion, sealing said sleeve, and permitting the water of leakage to escape from the sleeve; closing the vent, thereby retaining the water of leakage in the sleeve, and forming an elastic support, or cushion for the wall of the fractured portion of the pipe, as herein set forth.

2. The method of repairing a ruptured water-pipe, consisting in inclosing the fractured portion of the pipe in a sleeve, sealing the sleeve while permitting the water of leakage to escape therefrom, and inclosing air in the sleeve, and closing the vent through which the water of leakage escaped; thereby forming a combined water and air cushion about the fractured portion of the pipe in the sleeve, whereby the bursting strain is removed from the fractured pipe, and a permanent bond is assured.

3. The method of repairing a fractured water-pipe, and relieving the bursting tendency of such pipe, which consists in securing about such ruptured pipe a repair-sleeve, having a chamber surrounding the pipe, and a vent in its lower portion for water of leakage; sealing said sleeve, while the water of leakage is escaping; and closing said vent whereby the water of leakage is accumulated about the fractured pipe to form a cushion, or elastic body to relieve strain on the fracture, and serving to also seal the vent against the escape of inclosed air, which coöperates with the water to form a cushion, as herein set forth.

Signed at Metuchen, in the county of Middlesex and State of New Jersey, this 14th day of February, A. D. 1905.

ROBT. M. KELLOGG.

Witnesses:
 JOHN BREEN, Jr.,
 JOSEPH L. MOSS.